United States Patent
Chien

(10) Patent No.: US 11,460,627 B2
(45) Date of Patent: Oct. 4, 2022

(54) BACKLIGHT MODULE

(71) Applicant: Coretronic Corporation, Hsin-Chu (TW)

(72) Inventor: Hung-Ta Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/064,596

(22) Filed: Oct. 6, 2020

(65) Prior Publication Data

US 2021/0181403 A1 Jun. 17, 2021

Related U.S. Application Data

(60) Provisional application No. 62/948,808, filed on Dec. 17, 2019.

(30) Foreign Application Priority Data

Jul. 13, 2020 (CN) .......................... 202010668051.7

(51) Int. Cl.
*F21V 8/00* (2006.01)

(52) U.S. Cl.
CPC ........... *G02B 6/0068* (2013.01); *G02B 6/002* (2013.01); *G02B 6/0016* (2013.01); *G02B 6/0058* (2013.01)

(58) Field of Classification Search
CPC .... G02B 6/0068; G02B 6/0016; G02B 6/002; G02B 6/0058
See application file for complete search history.

(56) References Cited

U.S. PATENT DOCUMENTS

| 2001/0053075 | A1 | 12/2001 | Parker et al. |
| 2002/0163790 | A1* | 11/2002 | Yamashita ............. G02B 5/045 362/612 |
| 2004/0095769 | A1 | 5/2004 | Huang et al. |

(Continued)

FOREIGN PATENT DOCUMENTS

| CN | 1279393 | 10/2006 |
| CN | 101684927 | 11/2011 |

(Continued)

OTHER PUBLICATIONS

"Search Report of Europe Counterpart Application", dated Mar. 29, 2021, p. 1-p. 7.

(Continued)

*Primary Examiner* — Fatima N Farokhrooz
(74) *Attorney, Agent, or Firm* — JCIPRNET

(57) ABSTRACT

A backlight module including a light guide plate, a first light source, and a first optical film is provided. The light guide plate has a light incident surface, a light exiting surface, and a bottom surface, where the light incident surface is connected between the light exiting surface and the bottom surface, the light exiting surface is opposite to the bottom surface, and the bottom surface has a plurality of concentric ring-like first V-shaped microstructures. The first light source is disposed on a side of the light incident surface of the light guide plate, where a center of circle of the first V-shaped microstructures is aligned with the first light source. The first optical film is disposed on a side of the light exiting surface of the light guide plate. The first optical film has a plurality of concentric ring-like second V-shaped microstructures.

10 Claims, 9 Drawing Sheets

(56) References Cited

U.S. PATENT DOCUMENTS

| | | | |
|---|---|---|---|
| 2008/0165308 A1* | 7/2008 | Shiraishi | G02B 6/0055 349/65 |
| 2008/0198621 A1 | 8/2008 | Tanoue et al. | |
| 2012/0147613 A1* | 6/2012 | Goldschmidt | G02B 6/0001 362/494 |
| 2018/0074247 A1* | 3/2018 | Asakawa | G02B 6/0021 |

FOREIGN PATENT DOCUMENTS

| | | | |
|---|---|---|---|
| EP | 1544537 A1 * | 6/2005 | G02B 6/0038 |
| TW | I222533 | 10/2004 | |
| TW | I285772 | 8/2007 | |
| TW | I342414 | 5/2011 | |
| TW | M546509 | 8/2017 | |
| TW | I657291 | 4/2019 | |

OTHER PUBLICATIONS

"Office Action of Taiwan Counterpart Application", dated Apr. 28, 2021, pp. 1-7.

* cited by examiner

BACKLIGHT MODULE

CROSS-REFERENCE TO RELATED APPLICATION

This application claims the priority benefit of U.S. provisional application Ser. No. 62/948,808, filed on Dec. 17, 2019, and China application serial no. 202010668051.7, filed on Jul. 13, 2020. The entirety of each of the above-mentioned patent applications is hereby incorporated by reference herein and made a part of this specification.

BACKGROUND OF THE INVENTION

1. Field of the Invention

The invention relates to an optical module, and in particular, to a backlight module.

2. Description of Related Art

A highly collimated plane light source limits a light-emitting angle thereof within a small range, and therefore the forward brightness is higher and rays at a large angle are suppressed. Also, for a specific imaging device, the power consumption can be reduced and stray light can be refrained from being generated. Generally, the highly collimated plane light source is usually applied to the following.

(1) The highly collimated plane light source is adapted for a display with a privacy protection function because such light source has a small light cone angle, and a human eye needs to be within the light-emitting cone angle to clearly see the image displayed on the display. When the angle of the human eye relative to the display is different, the direction of the light-emitting cone angle needs to be switched for the light cone angle to face the eye of the user, and an onlooker away from the user is unable to clearly see the displayed image.

(2) The highly collimated plane light source is applied to a near-eye display that may switch a backlight light cone direction according to the position of the human eye. While it is difficult to achieve a large area due to use of V-shaped microstructures distributed in concentric circles in the light guide plate, such light guide plate fits well with a small-sized display with backlight (such as a liquid crystal display). Therefore, the highly collimated plane light source is suitable as a backlight module of a virtual reality apparatus, a head-mounted display, and the near-eye display. In such systems, stray light can occur easily if the NA value of an illumination system is greater than the value required for imaging. In addition, reducing the light-emitting cone may reduce power consumption and further reduce weight. If the NA value of the illumination system is less than the value required for imaging, a plurality of light cones in different directions may be superimposed to achieve the NA value required for imaging. At this time, a direction and the size of the superimposed light cones may be further adjusted according to the position of the human eye and the image content. In this way, stray light can be reduced, contrast can be increased, and power consumption can be reduced.

(3) A light field display is a light field display including a sub-image and a microlens array and requires a small NA value for imaging, and therefore stray light and a ghost image may be prevented. By changing the direction of the light-emitting cone, energy can be transferred in different visible regions. In this way, image light can be concentrated on the human eye according to the position of the human eye, so as to increase the movable range of the eye.

However, the highly collimated plane light source in the market usually has an asymmetric light-emitting cone. In order to achieve a symmetrical light shape, an additional optical film, such as a lenticular film, is required, and the greater number of optical films lead to a higher cost.

In addition, there is also a backlight module in the market that uses holograms instead of the V-shaped microstructures to guide the light out of the light guide plate. Although a holographic pattern is a concentric circle matched with a point light source, which results in a relatively uniform light cone, the dispersion characteristic of the holographic pattern makes it difficult to be applied to white light.

Therefore, how the plane light source controls the size and the shape of the light-emitting cone at the same time while generating a uniform light cone and further switching the direction of the light-emitting cone has become an issue to work on.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a backlight module, and the backlight module may switch a direction of a light-emitting cone in a case that a uniform light cone is generated.

An embodiment of the invention provides a backlight module including a light guide plate, a first light source, and a first optical film. The light guide plate includes a light incident surface, a light exiting surface, and a bottom surface, where the light incident surface is connected between the light exiting surface and the bottom surface, the light exiting surface is opposite to the bottom surface, and the bottom surface includes a plurality of concentric ring-like first V-shaped microstructures. The first light source is disposed on a side of the light incident surface of the light guide plate, where a center of circle of the first V-shaped microstructures is aligned with a first light source. The first optical film is disposed on a side of the light exiting surface of the light guide plate. The first optical film includes a plurality of concentric ring-like second V-shaped microstructures.

Based on the foregoing, in the backlight module of the embodiments of the invention, the bottom surface of the light guide plate includes the plurality of concentric ring-like first V-shaped microstructures, the center of circle of the first V-shaped microstructures is aligned with the first light source, and the first optical film having the plurality of concentric ring-like second V-shaped microstructures is disposed. Therefore, the backlight module may have a highly collimated light shape of exiting light.

Other objectives, features and advantages of the invention will be further understood from the further technological features disclosed by the embodiments of the invention where there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
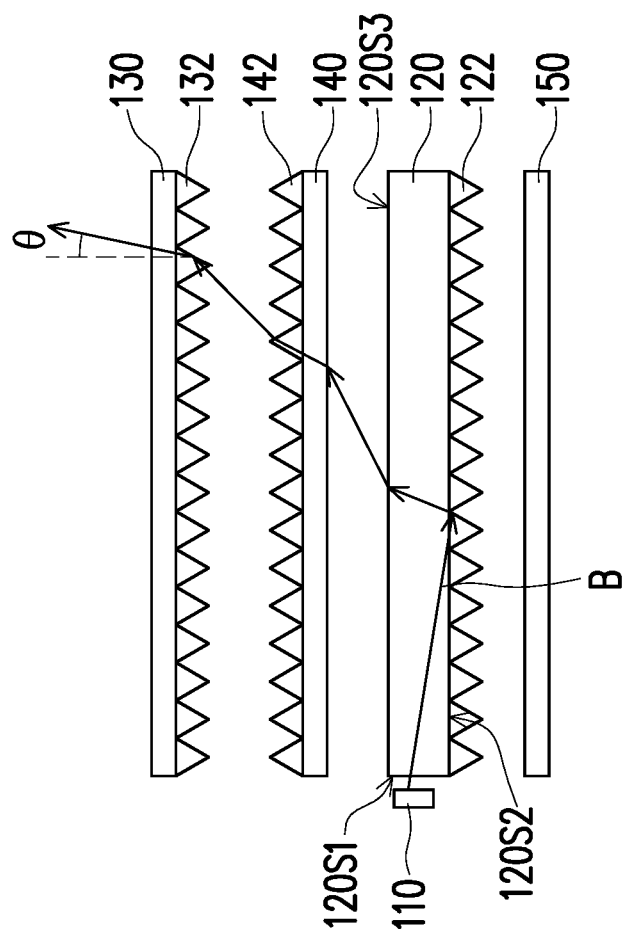
FIG. 1 is a schematic cross-sectional view of a backlight module according to an embodiment of the invention.

FIG. 1 is a schematic cross-sectional view of a backlight module according to an embodiment of the invention. Referring to FIG. 1, an embodiment of the invention provides a backlight module 100. The backlight module includes a light guide plate 120, a first light source 110, and a first optical film 130. The light guide plate 120 and the first optical film 130 are arranged along an arrangement direction (a Z-axis direction in FIG. 1).

Figure 2:
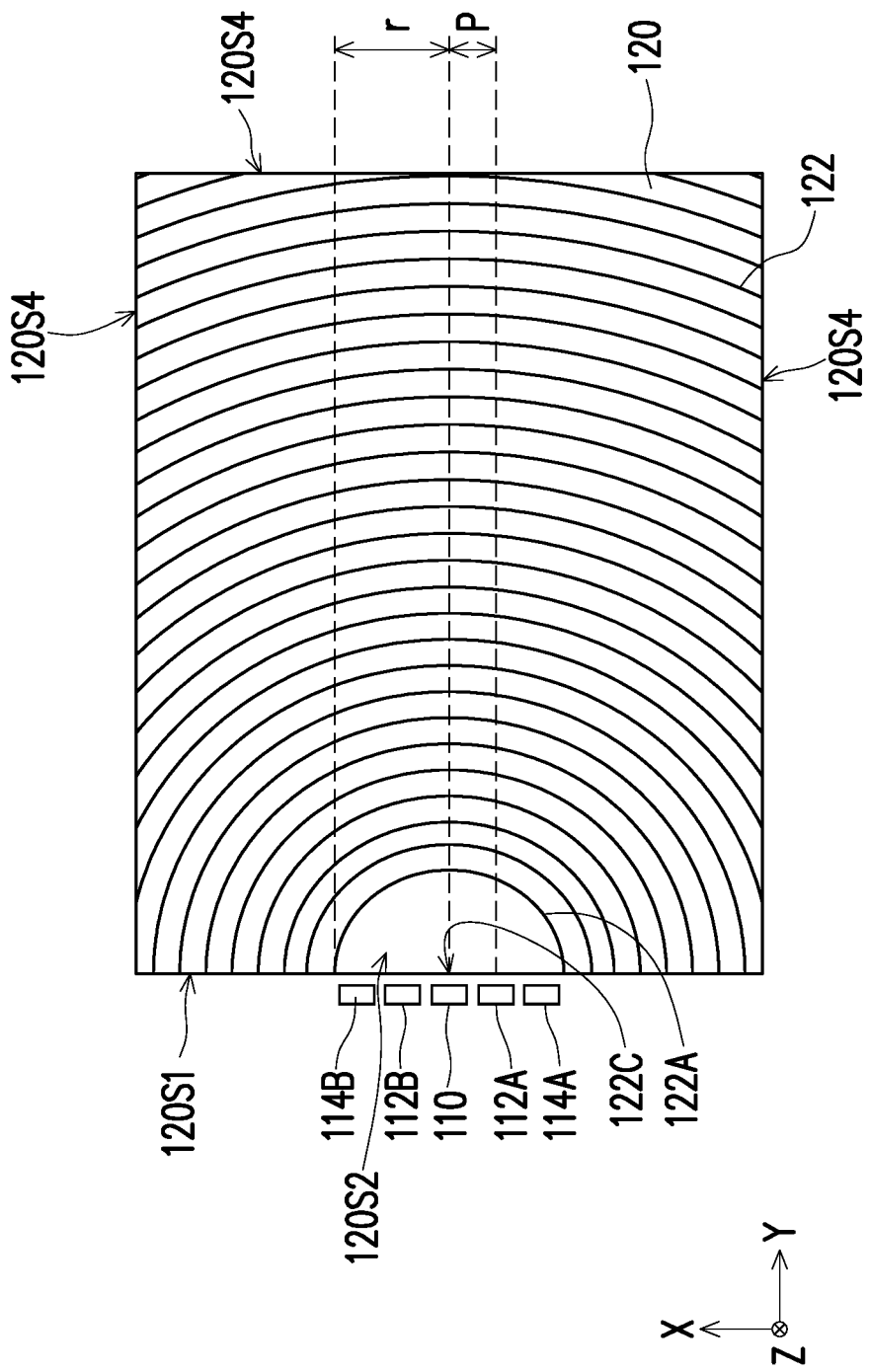
FIG. 2 is a bottom view of a light guide plate of the backlight module according to an embodiment of the invention.

FIG. 2 is a bottom view of a light guide plate of the backlight module according to an embodiment of the invention. Referring to both FIG. 1 and FIG. 2, in the present embodiment, a material of the light guide plate 120 may be plastic, glass, or other suitable materials for the light beam to penetrate, but the invention is not limited thereto. The light guide plate 120 has a light incident surface 120S1, a bottom surface 120S2, and a light exiting surface 120S3. The light incident surface 120S1 is connected between the light exiting surface 120S3 and the bottom surface 120S2, and the light exiting surface 120S3 is opposite to the bottom surface 120S2. In the present embodiment, the light guide plate 120 further has a plurality of side surfaces 120S4. The side surface 120S4 may be connected to the light incident surface 120S1, the bottom surface 120S2, and the light exiting surface 120S3, or the side surface 120S4 may be connected to the bottom surface 120S2 and the light exiting surface 120S3.

In the present embodiment, the bottom surface 120S2 of the light guide plate 120 has a plurality of concentric ring-like first V-shaped microstructures 122. In other words, the plurality of first V-shaped microstructures 122 have a same center 122C of circle and are located at a same position. In the present embodiment, a bottom surface 120S2 of the light guide plate 120 further has a flat region between the light incident surface 120S2 and a first V-shaped microstructure 122A. The first V-shaped microstructure 122A is a first V-shaped microstructure closest to the center 122C of the circle among the plurality of first V-shaped microstructures 122. The flat region is adjacent to the light incident surface 120S1 of the light guide plate 120, and the first V-shaped microstructure 122 is not disposed in the flat region. In an embodiment, a radius r of the flat region is, for example, 10 mm. However, the invention is not limited thereto. The radius r of the flat region or a ratio of an area of the flat region to an area of a region where the first V-shaped microstructure 122 is disposed is determined according to design requirements. In the backlight module 100 of an embodiment of the invention, because the light guide plate 120 may include the flat region, a Mura hot spot of a light shape of exiting light of the backlight module 100 on a side of the light incident surface 120S1 may be effectively reduced.

In addition, in the present embodiment, the first light source 110 may be a light-emitting diode (LED) or other suitable light sources. The first light source 110 is preferably a light source with a high Lumen value. The first light source 110 is disposed on a side of the light incident surface 120S1 of the light guide plate 120, the light guide plate 120 has a direction (a Y-axis direction in FIG. 1) of a central axis (not shown), and the first light source 110 is disposed on the direction of the central axis of the light guide plate 120, and the direction of the central axis is perpendicular to the arrangement direction. The center 122C of the circle of the first V-shaped microstructure 122 is aligned with and corresponds to the first light source 110.

In an embodiment, the backlight module 100 further includes at least one of the second light sources 112A, 112B, 114A, 114B. The second light sources 112A, 112B, 114A, and 114B may be light-emitting diodes (LEDs) or other suitable light sources. The second light sources 112A, 112B, 114A, 114B are preferably light sources with a high Lumen value. In addition, the second light sources 112A, 112B, 114A, and 114B are disposed on a side of the light incident surface 120S1 of the light guide plate 120. The second light sources 112A, 112B, 114A, and 114B and the first light source 110 are arranged at intervals of a pitch P on the light incident surface 120S1 in a direction perpendicular to the arrangement direction. In other words, the first light source 110 and the second light sources 112A, 112B, 114A, and 114B are arranged in an X-axis direction.

In the present embodiment, the first light source 110 and the second light sources 112A, 112B, 114A, 114B are configured to emit a light beam B. After penetrating the light incident surface 120S1 of the light guide plate 120, the light beam B is transmitted in the light guide plate 120 through total reflection. When the light beam B is transmitted to the first V-shaped microstructure 122, the first V-shaped microstructure 122 destroys the total reflection of the light beam B, and causes the light beam B to penetrate the light exiting surface 120S3 and to be transmitted toward the first optical film 130.

In an embodiment, a number of the second light sources 112A, 112B, 114A, and 114B may be an even number, and the second light sources 112A, 112B, 114A, and 114B are arranged at intervals with respect to the first light source 110 as a center. In addition, FIG. 1 illustrates four second light sources 112A, 112B, 114A, 114B. However, the invention is not limited thereto. A to-be-set number of the second light sources 112A, 112B, 114A, and 114B of the backlight module 100 is determined according to design requirements of a light shape of exiting light of the backlight module 100.

In an embodiment, the backlight module 100 further includes a reflective sheet 150. The reflective sheet 150 is disposed on a side of the bottom surface 120S2 of the light guide plate 120. Because a part of the light beam B is emitted from the bottom surface 120S2 of the light guide plate 120 during transmission through the light guide plate 120, a loss of light energy is caused. Therefore, by disposing of the reflective sheet 150, the light beam B emitted from the bottom surface 120S2 of the light guide plate 120 may be reflected and transmitted back to the light guide plate 120, to improve utilization of the light energy. The reflective sheet 150, the light guide plate 120, and the first optical film 130 are arranged along an arrangement direction (a Z-axis direction in FIG. 1).

Figure 3:
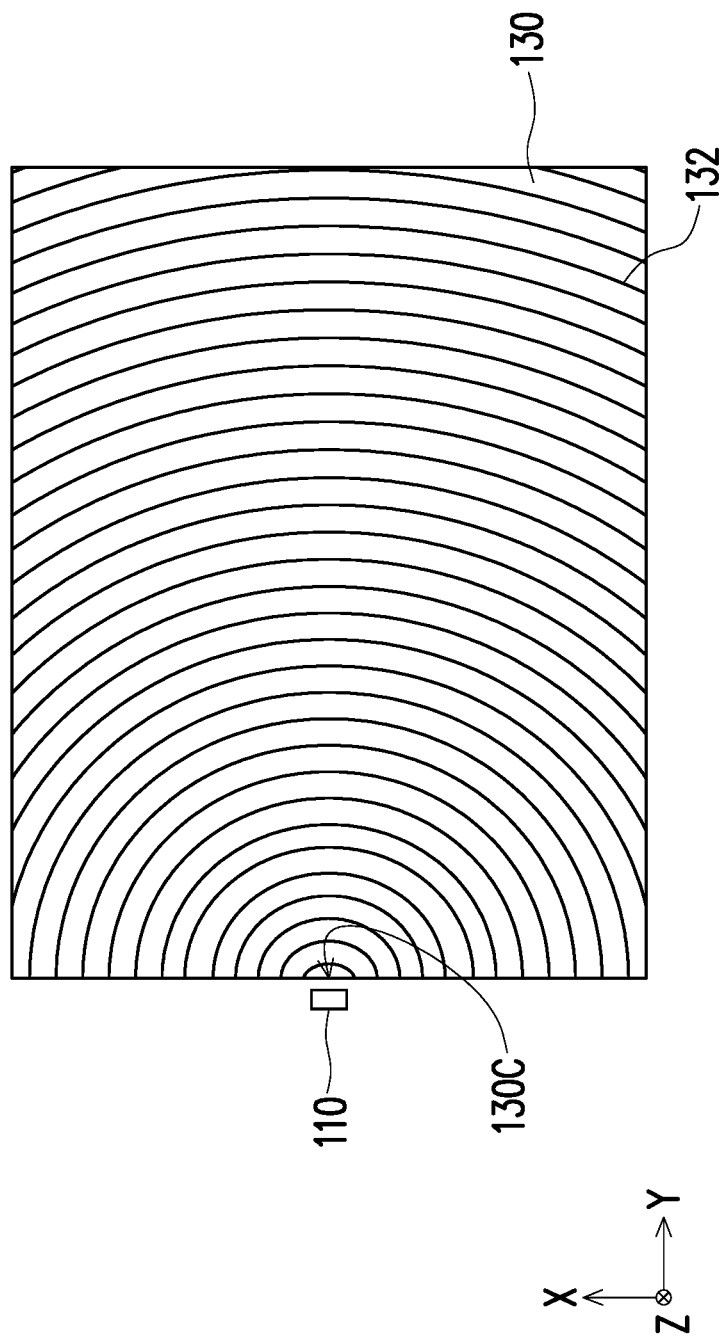
FIG. 3 is a bottom view of a first optical film of the backlight module according to an embodiment of the invention.

FIG. 3 is a bottom view of a first optical film of the backlight module according to an embodiment of the invention. Referring to both FIG. 1 and FIG. 3, in the present embodiment, the first optical film 130 is disposed on a side of the light exiting surface 120S3 of the light guide plate 120. The first optical film 130 is, for example, an optical inverse prism (a turning film). In addition, the first optical film 130 has a plurality of concentric ring-like second V-shaped microstructures 132, and the second V-shaped microstructures 132 are disposed on a surface near the light exiting surface 120S3 of the light guide plate 120. A center 130C of circle of the second V-shaped microstructures 132 is aligned with and corresponds to the first light source 110.

Figure 4:
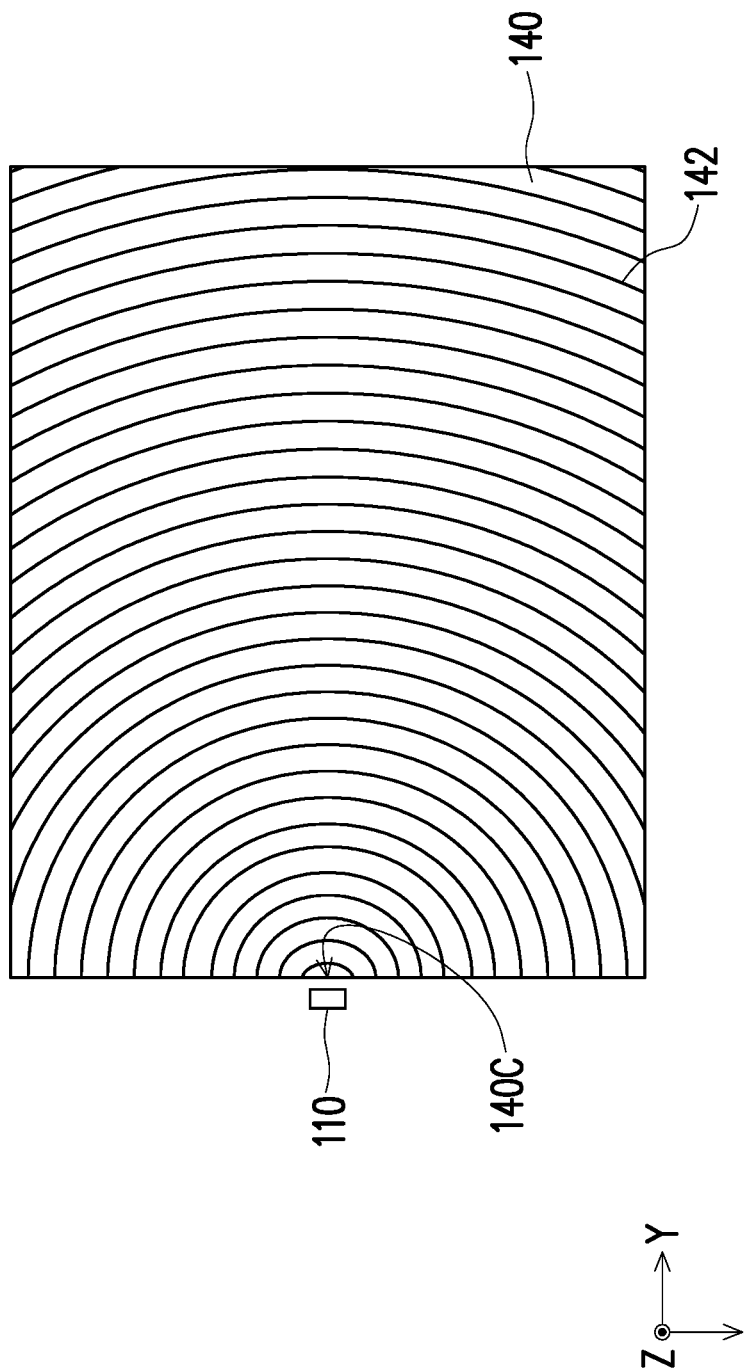
FIG. 4 is a top view of a second optical film of the backlight module according to an embodiment of the invention.

FIG. 4 is a top view of a second optical film of the backlight module according to an embodiment of the invention. Referring to both FIG. 1 and FIG. 4, in an embodiment, the backlight module 100 further includes a second optical film 140. The second optical film 140 is, for example, a brightness enhancement film (BEF). What's more, the second optical film 140 is disposed between the light guide plate 120 and the first optical film 130, and has a plurality of concentric ring-like third V-shaped microstructures 142. The third V-shaped microstructures 142 of the second optical film 140 are disposed on a surface away from the light exiting surface 120S3 of the light guide plate 120, and a center 140C of circle of the third V-shaped microstructures 142 is aligned with and corresponds to the first light source 110.

Figure 5C:
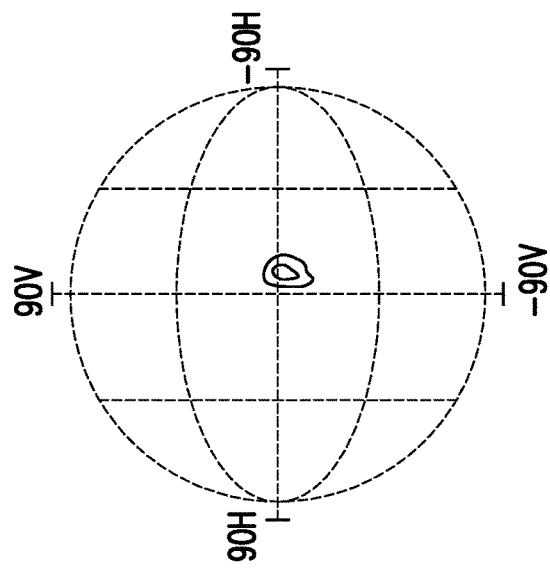
FIG. 5A to FIG. 5C are respectively different examples of a light shape of exiting light of the backlight module according to an embodiment of the invention.
Figure 5B:
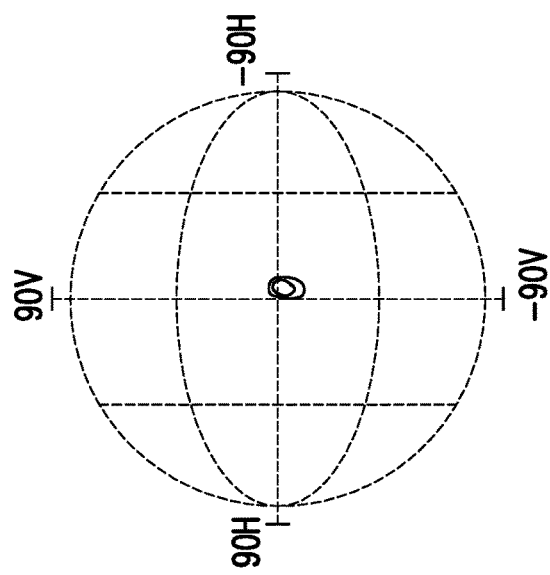
Figure 5A:
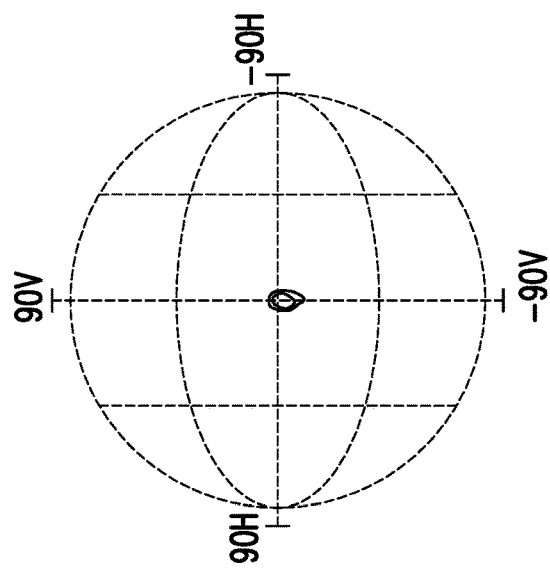
Figure 6:
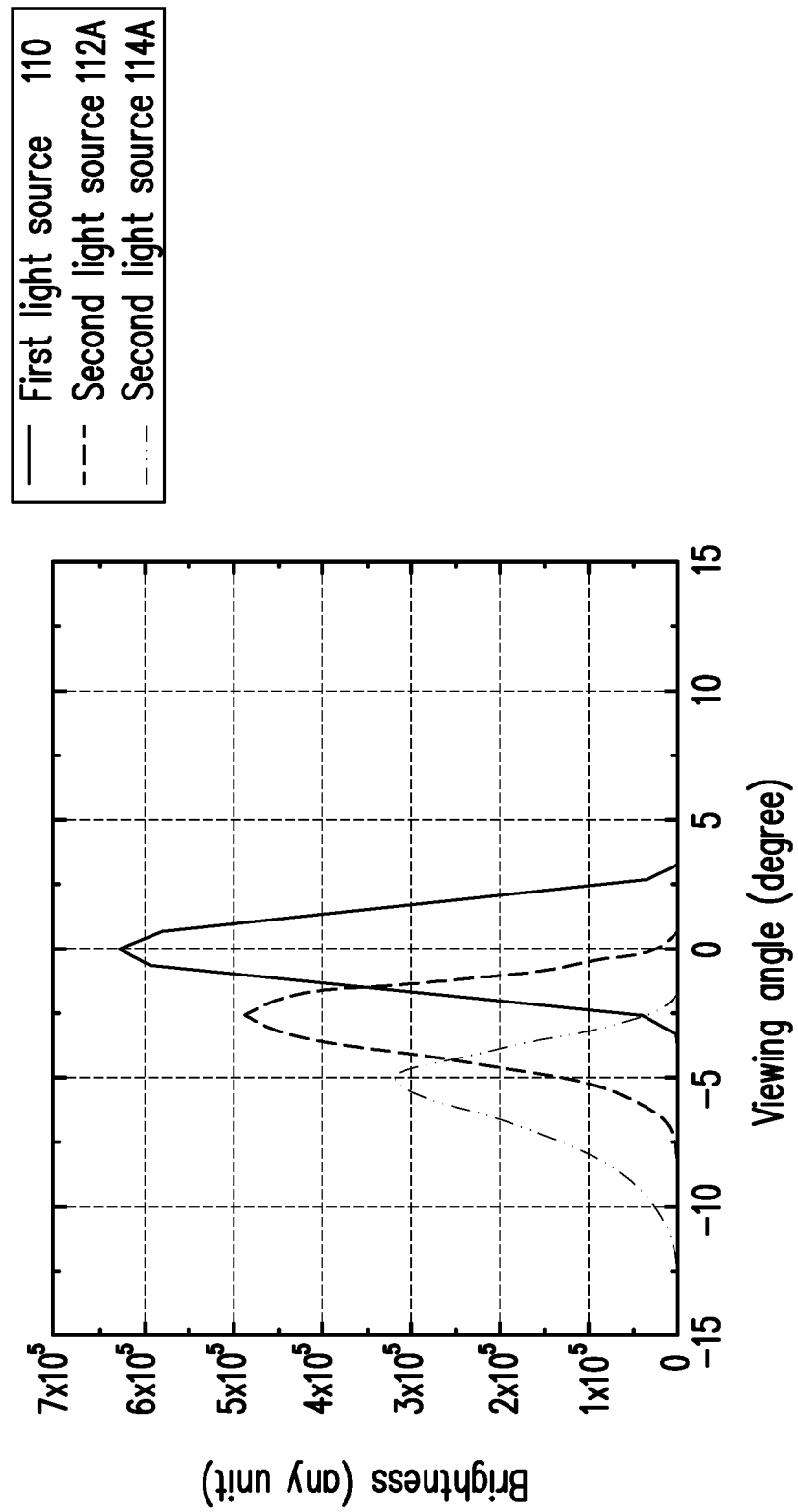
FIG. 6 is a curve graph of light exiting brightness of the backlight module relative to a viewing angle according to an embodiment of the invention.

FIG. 5A to FIG. 5C are respectively different examples of a light shape of exiting light of the backlight module according to an embodiment of the invention. FIG. 5A shows a light shape of exiting light of a backlight module 100 after a first light source 110 is turned on only, FIG. 5B shows the light shape of exiting light of the backlight module 100 after a second light source 112A is turned on only, and FIG. 5C shows the light shape of exiting light of the backlight module 100 after a second light source 114A is turned on only. FIG. 6 is a curve graph of light exiting brightness of the backlight module relative to a viewing angle according to an embodiment of the invention.

Referring to FIG. 5A to FIG. 6, when the first light source 110 is turned on only, the first light source 110 is configured to cause the light shape of exiting light of the backlight module 100 to symmetrically fall within a specific viewing angle range perpendicular to a light exiting surface 120S3 as a center. For example, in FIG. 6, a viewing angle of 0 degree is used as the center, and the viewing angle range is less than or equal to 2.5 degrees or greater than or equal to −2.5 degrees. In other words, in the foregoing embodiment of the invention, the first light source 110 is disposed at a center of a light incident surface 120S1 perpendicular to an arrangement direction, a center 122C of circle of a first V-shaped microstructure 122 is aligned with the first light source 110, and a center 130C of circle of a second V-shaped microstructure 132 is aligned with the first light source 110. The light shape of exiting light of the backlight module 100 uses a viewing angle of 0 degrees as a center. However, the invention is not limited thereto. A position of the first light source 110 is determined according to design of the light shape of exiting light of the backlight module 100.

Referring to FIG. 2 and FIG. 5A to FIG. 6, in FIG. 2, when the first light source 110 and the second light sources 112A, 112B, 114A, and 114B are all turned on, the light shape of exiting light of the backlight module 100 may symmetrically fall within another specific viewing angle range perpendicular to the light exiting surface 120S3 as a center. For example, in FIG. 6, a viewing angle of 0 degree is used as the center, and the viewing angle range is less than or equal to 10 degrees or greater than or equal to −10 degrees. In other words, compared to that only the first light source 110 is turned on, when all the light sources are turned on, the light shape of exiting light of the backlight module 100 falls within a larger viewing angle range.

In another embodiment, at least one of the first light source 110 and the second light sources 112A, 112B, 114A, 114B is turned on, so that the light shape of exiting light of the backlight module 100 falls within another specific viewing angle range. In other words, according to a relative position or an angle between the backlight module 100 and a line of sight of a user, the user may make an adjustment to turn on some light sources required to be turned on, to cause the light shape of exiting light of the backlight module 100 to fall within a viewing angle range required by the user. Therefore, the backlight module 100 of the embodiment of the invention brings better user experience to the user.

Figure 7A:
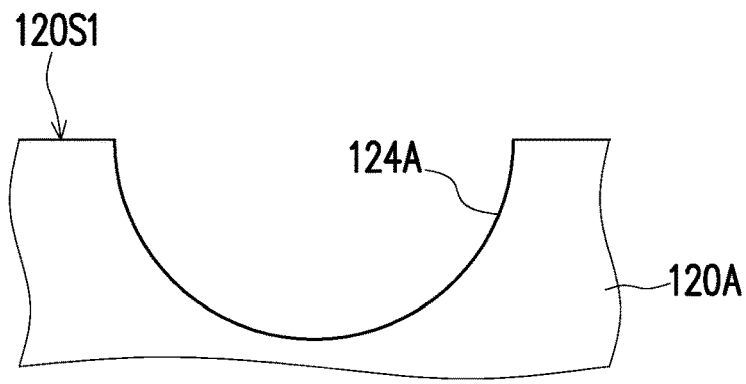
FIG. 7A to FIG. 7C are respectively different examples in which the light guide plate of the backlight module according to an embodiment of the invention has a diffusion structure on a light incident surface.
Figure 7B:
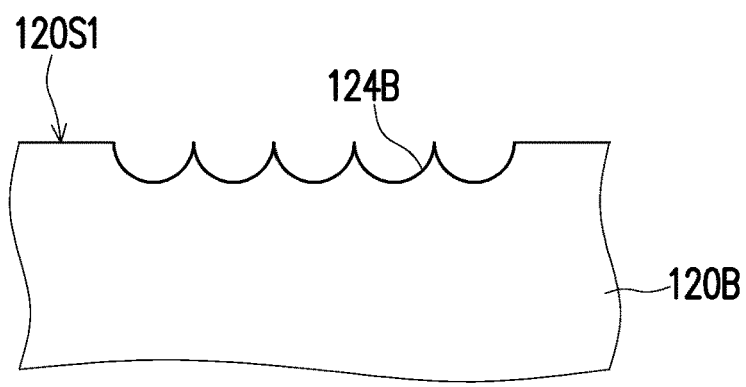
Figure 7C:
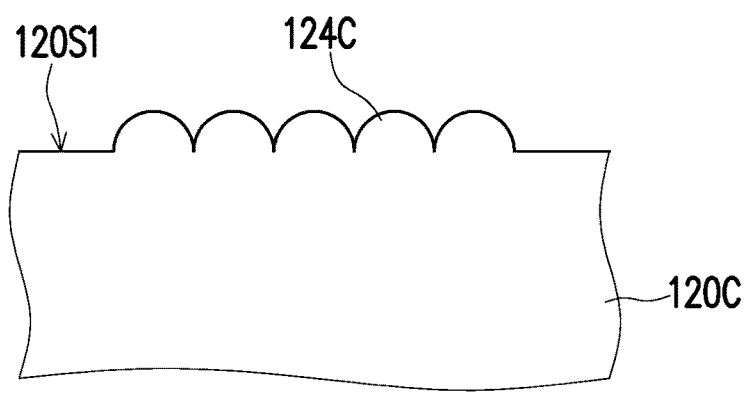
Figure 7D:
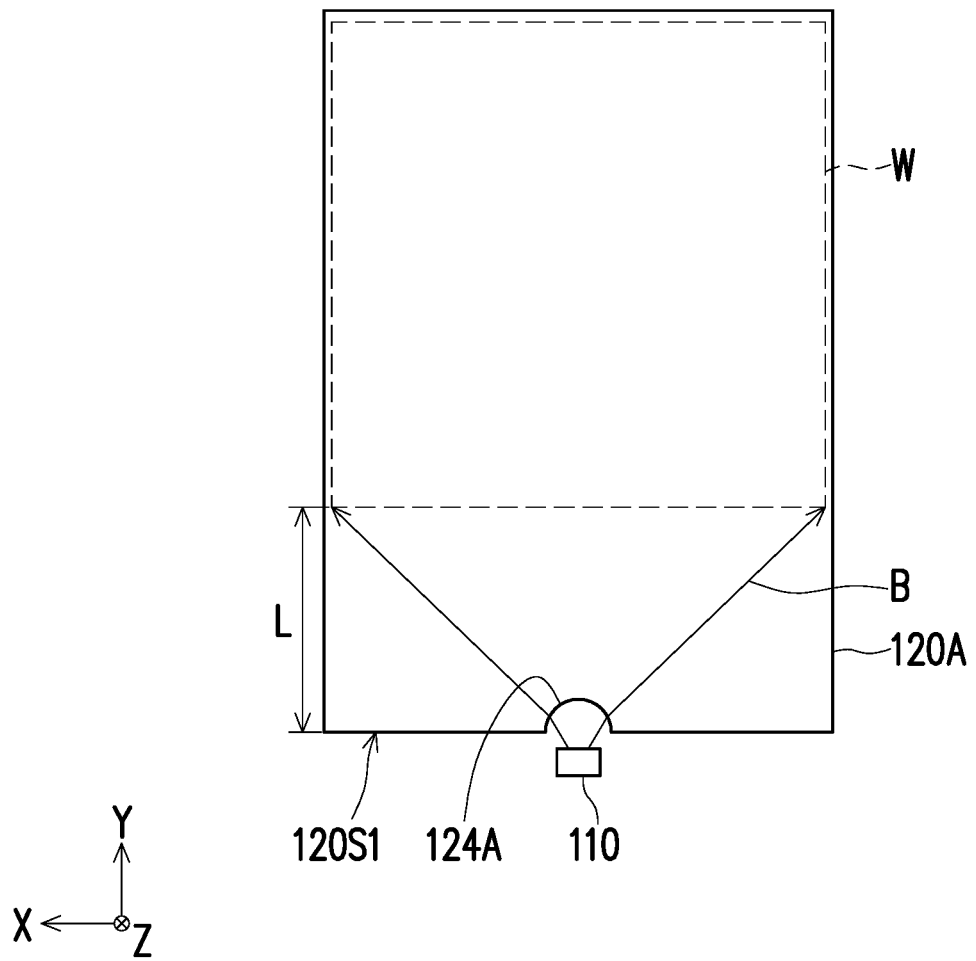
FIG. 7D is an example of light beam propagation according to the diffusion structure of FIG. 7A.

FIG. 7A to FIG. 7C are respectively different examples in which the light guide plate of the backlight module according to an embodiment of the invention has a diffusion structure on a light incident surface. FIG. 7D is an example of light beam propagation according to the diffusion structure of FIG. 7A. As shown in FIG. 7D, when a light beam B projected by a first light source 110 enters a light guide plate 120A (having a diffusion structure 124A) through a light incident surface 120S1, because refraction of the light beam B complies with Snell's law, a light cone angle after the light beam B enters the light guide plate 120 becomes larger, so that a propagation distance (representing a distance L from the light incident surface 120S1 to a boundary of an effective region W) of the light beam B is shortened to increase an effective light exiting region W of the light guide plate 120A. Compared to a light guide plate without the diffusion structure, an excessively small light cone angle requires a longer propagation distance of the light beam B, and reduces a size of the effective region W.

Figure 8:
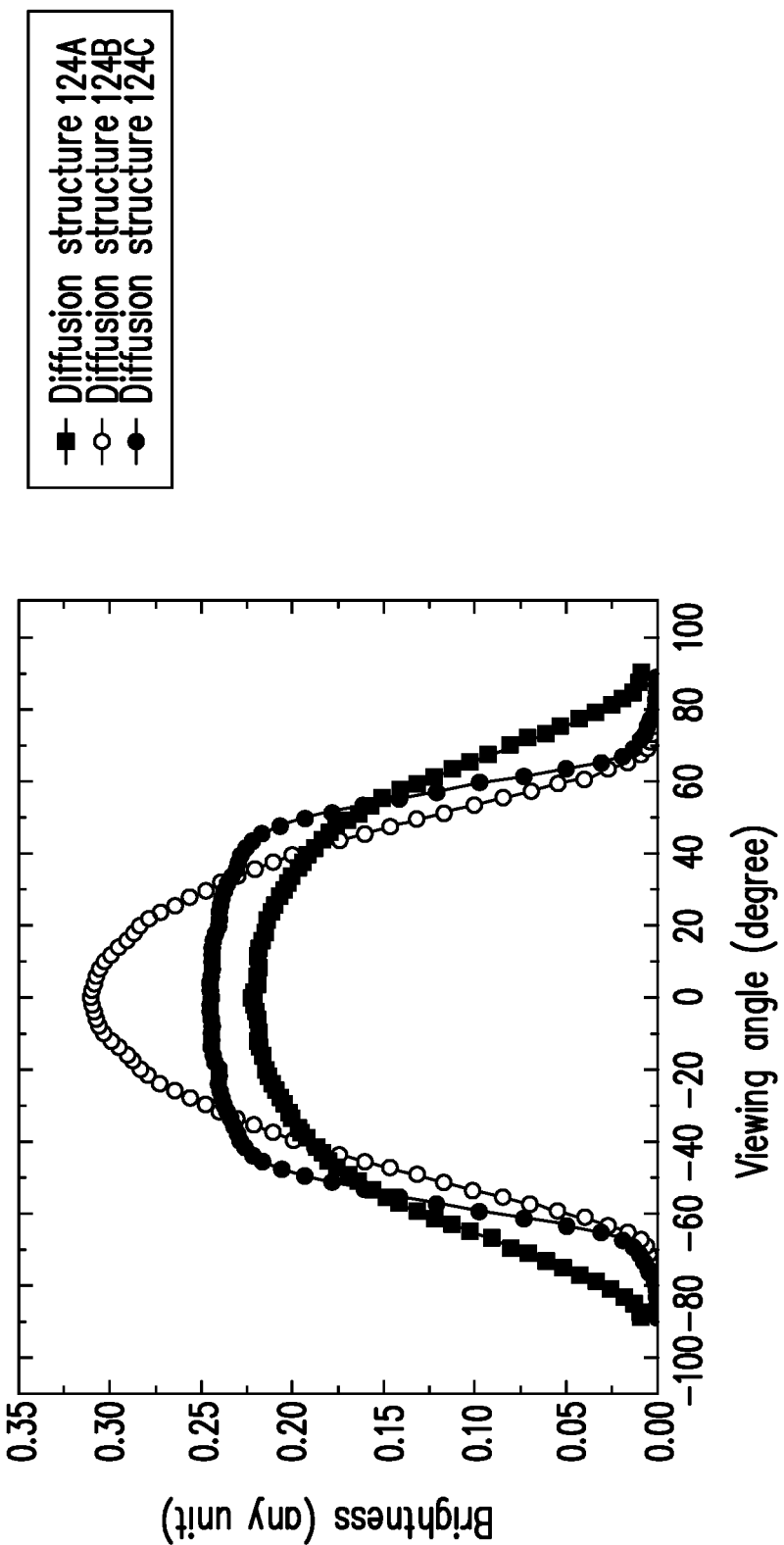
FIG. 8 is a curve graph of light exiting intensity of the backlight module according to an embodiment of the invention relative to an angle when the light guide plate has a diffusion structure on the light incident surface.

FIG. 8 shows light intensity distribution of a light cone angle after a light beam B is guided into a light guide plate 120 when the light guide plate has different diffusion structures on a light incident surface. Referring to FIG. 7A to FIG. 8, in an embodiment, light incident surfaces 120S1 of light guide plates 120A, 120B, 120C respectively have diffusion structures 124A, 124B, 124C. The diffusion structure 124A is a (semi) air column, and the diffusion structure 124A refers to a groove formed by the light guide plate 120A. The diffusion structures 124B and 124C are microstructure arrays. In addition, a material of the diffusion structure 124C is, for example, a material with a high refractive index.

Referring to FIG. 7A and FIG. 8, when the light incident surface 120S1 of the light guide plate 120A of an embodiment of the invention has a diffusion structure 124A of the (semi) air column, a light cone guided into the light guide plate 120A is relatively large.

Referring to FIG. 7B and FIG. 8, when the light incident surface 120S1 of the light guide plate 120B of an embodiment of the invention has a diffusion structure 124B of the microstructure array, a light cone guided into the light guide plate 120B is relatively concentrated.

Referring to FIG. 7C and FIG. 8, when the light incident surface 120S1 of the light guide plate 120C of an embodiment of the invention has a diffusion structure 124C of the microstructure array, a light cone guided into the light guide plate 120C is relatively uniform.

In another embodiment, the light incident surface 120S1 of the light guide plate 100 may have a light scattering structure, and the light scattering structure is a divergent lens. In other words, when the backlight module 100 of the embodiment of the invention has the diffusion structures 124A, 124B, 124C or light scattering structures on the light incident surface 120S1 of the light guide plate, sizes of the backlight module 100 and the light guide plate 120 may be effectively reduced (under a same effective region, because the light cone becomes larger, a shorter propagation distance L is provided, as shown in FIG. 7D).

Based on the foregoing, in the backlight module of the embodiments of the invention, the bottom surface of the light guide plate has the plurality of concentric ring-like first V-shaped microstructures, the center of circle of the first V-shaped microstructures is aligned with the first light source, and the first optical film having the plurality of concentric ring-like second V-shaped microstructures is disposed. Therefore, the light shape of exiting light of the backlight module may be symmetrically concentrated in a specific viewing angle range in which the viewing angle of 0 degrees serves as the center.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising a light guide plate, a first light source, at least two second light sources and a first optical film, wherein the light guide plate comprises a light incident surface, a light exiting surface, and a bottom surface, the light incident surface is connected between the light exiting surface and the bottom surface, the light exiting surface is opposite to the bottom surface, and the bottom surface comprises a plurality of concentric ring-like and continuous first V-shaped microstructures;

the first light source is disposed on a side of the light incident surface of the light guide plate; and the first optical film is disposed on a side of the light exiting surface of the light guide plate and comprises a plurality of concentric ring-like and continuous second V-shaped microstructures, wherein the light guide plate and the first optical film are arranged along an arrangement direction; and the at least two second light sources disposed on the side of the light incident surface of the light guide plate, and the at least two second light sources and the first light source are arranged at an interval of a pitch in a first direction perpendicular to the arrangement direction, the pitch is a distance between a center of the first light source and a center of each of the at least two second light sources, wherein the bottom surface of the light guide plate further comprises a flat region parallel to the light exiting surface, and the flat region is located between a first V-shaped microstructure closest to a center of circle among the plurality of concentric ring-like and continuous first V-shaped microstructures and the light incident surface, and the flat region is a semicircle with a diameter, wherein the pitch is shorter than the diameter, and wherein the light guide plate is configured to provide a central axis with a second direction, and the central axis of the light guide plate is located on a middle of a width of the light guide plate, the center of circle of the plurality of concentric ring-like and continuous first V-shaped microstructures is located on the central axis, the first light source is aligned with the center of circle of the plurality of concentric ring-like and continuous first V-shaped microstructures and the at least two second light sources do not align with the center of circle of the plurality of concentric ring-like and continuous first V-shaped microstructures, and the first light source is disposed on the central axis of the light guide plate, and is disposed between the at least two second light sources, and an arranged distance of the first light source and the at least two second light sources, in the first direction, is smaller than the diameter of the semicircle, and the first direction and the central axis are perpendicular to the arrangement direction.

2. The backlight module according to claim 1, wherein at least one of the first light source and the at least two second light sources are turned on, so that a light shape of exiting light of the backlight module falls within a specific viewing angle range.

3. The backlight module according to claim 1, wherein a number of the at least two second light sources are an even number, and the at least two second light sources are arranged at intervals with respect to the first light source as a center.

4. The backlight module according to claim 1, wherein a center of circle of the plurality of concentric ring-like and continuous second V-shaped microstructures is aligned with the first light source.

5. The backlight module according to claim 1, wherein the plurality of concentric ring-like and continuous second V-shaped microstructures of the first optical film are disposed on a surface near the light exiting surface of the light guide plate.

6. The backlight module according to claim 1, further comprising:
a second optical film disposed between the light guide plate and the first optical film and having a plurality of concentric ring-like third V-shaped microstructures.

7. The backlight module according to claim 1, wherein the light incident surface of the light guide plate comprises a diffusion structure, and the diffusion structure is an air column or a microstructure array.

8. The backlight module according to claim 1, wherein the light incident surface of the light guide plate comprises a light scattering structure, and the light scattering structure is a divergent lens.

9. The backlight module according to claim 6, wherein a center of circle of the plurality of third V-shaped microstructures is aligned with the first light source.

10. The backlight module according to claim 6, wherein the plurality of third V-shaped microstructures of the second optical film are disposed on a surface away from the light exiting surface of the light guide plate.

* * * * *